United States Patent
Minardos et al.

(10) Patent No.: US 10,430,847 B2
(45) Date of Patent: Oct. 1, 2019

(54) DYNAMIC DOMAIN REGISTRATION

(71) Applicant: PLAN BEE LLC, Santa Monica, CA (US)

(72) Inventors: George Minardos, Santa Monica, CA (US); Thomas A. Brackey, II, Beverly Hills, CA (US)

(73) Assignee: Plan Bee LLC, Santa Monica, CA (US)

( * ) Notice: Subject to any disclaimer, the term of this patent is extended or adjusted under 35 U.S.C. 154(b) by 777 days.

(21) Appl. No.: 14/980,548

(22) Filed: Dec. 28, 2015

(65) Prior Publication Data
US 2017/0186061 A1  Jun. 29, 2017

(51) Int. Cl.
G06Q 30/02 (2012.01)
G06Q 30/06 (2012.01)
H04L 29/12 (2006.01)

(52) U.S. Cl.
CPC ..... *G06Q 30/0611* (2013.01); *G06Q 30/0283* (2013.01); *G06Q 30/0625* (2013.01); *H04L 61/302* (2013.01); *H04L 61/1511* (2013.01)

(58) Field of Classification Search
CPC ........... G06Q 30/0206; G06Q 30/0283; G06Q 30/0611; G06Q 30/0625; H04L 61/302; H04L 61/1511
USPC ................................................ 705/26.4, 400
See application file for complete search history.

(56) References Cited

U.S. PATENT DOCUMENTS

| 2003/0065818 A1* | 4/2003 | Anderson | G06F 3/0219 709/245 |
| 2013/0173795 A1* | 7/2013 | McPherson | H04L 63/168 709/225 |
| 2015/0324947 A1* | 11/2015 | Winograd | G06F 17/30038 382/100 |
| 2016/0119283 A1* | 4/2016 | Ptalis | H04L 61/302 709/223 |

(Continued)

OTHER PUBLICATIONS

Lindenthal, Thies. "Valuable words: The price dynamics of internet domain names." Journal of the Association for Information Science and Technology 65.5 (2014): 869-881 (Year: 2014).*

Primary Examiner — William J Allen
Assistant Examiner — Michelle T Kringen
(74) Attorney, Agent, or Firm — Ansari Katiraei LLP; Arman Katiraei; Sadiq Ansari (57) ABSTRACT

Some embodiments provide a system and methodology for registering and configuring top-level domains (TLDs), country-code top-level domains (ccTLDs), generic top-level domains (gTLDs), international top-level domains (iTLDs), or any domain name that is resolved to a network address using Domain Name System (DNS) servers. The system distinguishes between the domain names it offers for sale by continually changing pricing of the domain names according to changing significance and demand for the domain names. The pricing is dynamically determined based on trending words, combined significance of multiple words forming the domain name, significance of individual words, length of the domain name, and scarcity of similar domain names. Combined significance can be determined from a first word in a (Continued)

second-level domain (SLD) and a second word in a TLD or gTLD of the domain name. The system further configures and provides DNS operation for the domain names under its control.

15 Claims, 8 Drawing Sheets

(56) References Cited

U.S. PATENT DOCUMENTS

2016/0171115 A1\* 6/2016 Jheeta ............... G06F 17/30867 707/723
2016/0196346 A1\* 7/2016 Kamdar ............ G06F 17/30867 705/26.1

\* cited by examiner

DYNAMIC DOMAIN REGISTRATION

TECHNICAL FIELD

The present invention pertains to domain name registration through registries, registrars, resellers and other domain check services.

BACKGROUND ART

Domain names were originally restricted to top-level domain (TLDs) names having the .com, .net, and .org extensions as some examples or country-code top-level domains (ccTLDs) having the .us, .ca, and .eu extensions as some examples. Now, there are many generic top-level domains (gTLDs), international top-level domains (iTLDs), and other new top-level domains that provide different domain name extensions including domain names with .app, .business, .build, .site, and .shop extensions as gTLD examples and domain names with Chinese, Cyrillic, Arabic, and other non-Latin character extensions as iTLD examples.

Registries manage the domain name allocation of different TLDs, ccTLDs, gTLDs, and iTLDs. Registrars are typically accredited organizations that sell the domain names from one or more registries to the public. In addition to registries and registrars, there are also resellers and domain name check and pricing servers. Resellers are directly or indirectly approved or licensed by the Internet Corporation Assigned Names and Numbers (ICANN) to sell domain names in secondary markets or through third party sites. Domain name check and pricing services obtain availability and pricing of domain names from one or more registries, registrars, and resellers, and therefore can act to bridge the independent operation of these entities.

Registries and registrars traditionally have not differentiated between different domain names. All domain names on the original TLDs of .com, .net, and .org and ccTLDs are sold for a fixed price regardless of whether the domain names are highly sought after domain names such as short domain names, single word domain names, easily recognizable or memorable domain names, or domain names with a specific meaning or identifying some product or service as some examples. The newer gTLD's such as .build and others have the ability to create unique pricing for specific domain names. Registries set an initial price for the domain names under their control and the registrars typically markup those prices when selling the domain names to the public. The registrar is therefore an extension of the registry with the registry acting as the domain name wholesaler and registrar acting as the domain name retailer.

Secondary markets and auction sites can however differentiate between meaningful and desirable domain names and other arbitrary domain names. In fact, their primary objective is to identify and obtain meaningful and desirable domain names in order to sell them at premium prices. This model has encouraged squatters and other entities that have no intention of using a domain name to acquire meaningful and desirable domain names. Squatters hold on to the domain names until they can sell the domain names at inflated premium prices that generate profits for the squatters.

There is therefore a need to introduce automated intelligence to reduce the role of secondary markets and auction sites and dissuade squatters from buying domain names with no intention of using those domain names. To this end, there is a need to differentiate meaningful and desirable domain names from other arbitrary domain names. Furthermore, there is a need to differentiate pricing for these meaningful and desirable domain names from other arbitrary domain names. Differentiated pricing dissuades buyers that have no intention of using the domain names from squatting on the domain names as the initial cost of acquiring the domain name is increased, thereby making it more difficult and unlikely to profit from the resale of the domain name. In turn, the role of secondary markets and auction sites is reduced, thereby making it easier for potential buyers to directly acquire meaningful or desirable domain names as opposed to searching various secondary market sites in attempts to find a desirable domain name.

BRIEF DESCRIPTION OF THE DRAWINGS

A preferred embodiment of methods and systems for dynamic domain registration will now be described, by way of example only, with reference to the accompanying drawings in which.

DETAILED DESCRIPTION

Some embodiments provide a domain name point-of-sale or DNPOS for dynamically pricing, selling, and registering domain names. The DNPOS automatically and dynamically identifies and generates different lists of available domain names according to changing significance and demand for the available domain names. The DNPOS automatically and dynamically sets pricing for the domain names according to the changes in domain name significance, demand, and availability. In some embodiments, the DNPOS qualifies demand according to trending words. As such, pricing is not arbitrarily or manually set by an administrator as is done today in domain name registries, secondary markets, and/or auction sites. Instead, pricing is determined by one or more computers algorithmically as Internet activity of users change. In this manner, the DNPOS differentiates between the domain names it offers for sale. The DNPOS further registers domain names on behalf of purchasers. In some embodiments, the registration involves Domain Name System (DNS) configuration and operation, whereby DNPOS DNS servers resolve DNS queries directed to domain names sold and registered by the DNPOS.

This dynamic mode of operation distinguishes the DNPOS presented herein from the statically operating domain registries and registrars of the prior art, and more importantly, reduces the role of domain name squatters, secondary markets, and auction sites that are otherwise promoted by the static pricing and/or undifferentiated domain names offered for sale by registries and registrars of the prior art. In some embodiments, the DNPOS makes the initial cost of acquiring a desirable domain name higher relative to the prior art registries and registrars offering statically and/or equally priced domain names. As a result, the DNPOS reduces the potential for profit in reselling the domain name through a secondary market or auction site. This in turn increases domain name availability for buyers that intend to actually use a domain name for purposes of identifying a website, product, or service.

The DNPOS is a system for selling and configuring TLDs, ccTLDs, gTLDs, iTLDs, and any domain name that is resolved to a network address using DNS servers. The DNPOS can operate as one or both of a domain name registry or registrar. The DNPOS can alternatively operates as an ICANN licensed or approved reseller or as a domain name check and pricing that coalesces domain name information from one or more registries, registrars, and resellers.

When operating as a registry, the DNPOS dynamically sets pricing for domain names offered to one or more registrars. When operating as a registrar, the DNPOS dynamically sets pricing for domain names that are directly sold to the public. In some embodiments, the DNPOS is accredited by the Internet Corporation for Assigned Names and Numbers (ICANN). In some such embodiments, the DNPOS manages the allocation and original sale of a certain set of domain names, such as certain TLD, ccTLD, gTLD, and/or iTLD subsets.

The DNPOS is a fully automated system comprised of one or more machines. The machines monitor Internet activity, including search engine queries, online social media activity, blogs, and website popularity as some examples. The machines perform automated processes to differentiate different domain names and dynamically price them according to demand as determined in some embodiments through trending topics and words detected as a result of the monitoring. In some embodiments, the DNPOS machines also perform domain name registration as well as DNS configuration and resolution on behalf of domain name buyers. The DNPOS machines are described with reference to FIG. 8 below.

In some embodiments, potential buyers access the DNPOS through an online interface or application provided by the DNPOS. The online interface or application dynamically presents the most significant domain names that are available for purchase as well as the dynamic pricing for acquiring each available domain names. In some embodiments, the domain name pricing is set based on real-time trends detected at the time a user searches for a domain name to purchase.

Figure 1:
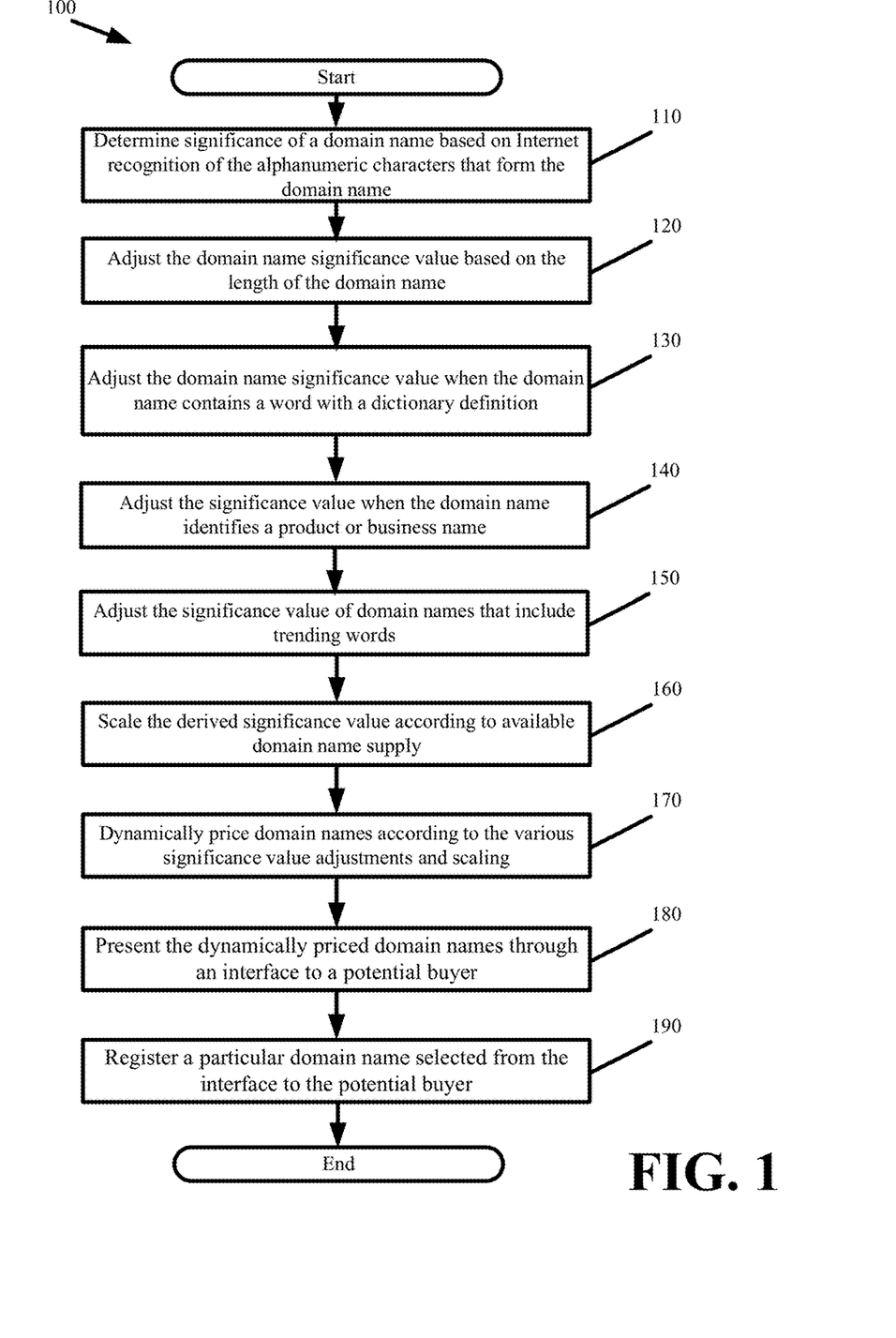
FIG. 1 presents a process for dynamically determining domain name significance according to the multi-tiered approach performed by the DNPOS of some embodiments.

The DNPOS dynamically determines domain name significance using a multi-tiered approach. The multi-tiered approach continually changes the significance that is attributed to each domain name based on trending topics and words. Significance is quantified as a significance value that is assigned to each available domain name. The significance value continually changes as the computed significance changes dynamically. FIG. 1 presents a process 100 for dynamically determining domain name significance according to the multi-tiered approach performed by the DNPOS of some embodiments.

The process 100 initially determines (at 110) significance of a domain name based on Internet recognition of the alphanumeric characters that form the domain name. In some embodiments, the initial significance determination is derived from Internet based searching of the alphanumeric characters that form the domain name. The searches can be conducted using search engines or social media sites as some examples. In other words, the DNPOS machines perform Internet searches for available domain names with and without the domain extension using one or more search engines. The DNPOS observes the resulting number of search results. The higher the number of search results, the greater the significance value the DNPOS attributes to the domain name. For example, the domain name "big" returns 3,980,000,000 search results, the domain name "bgsyk" returns 1,580 results. From these results, the DNPOS determines that the domain name for "big" has more significance than the domain name for "bigsky" which is more significant than the arbitrary domain name "bgsyk". Accordingly, the DNPOS attributes a different initial significance value to each of the domain names. In some embodiments, the initial significance determination is performed periodically (e.g., hourly or daily) or whenever an available domain name is presented to a user for sale. In some embodiments, the initial significance determination is affected by the importance of the sources presented in the search results. For instance, the DNPOS increases the significance value when the search results include a greater proportion of trusted or highly trafficked websites in the results.

The process then adjusts the initial significance value. The process performs a first adjustment for adjusting (at 120) the domain name significance value based on the length of the domain name. Shorter domain names are easier to remember and are therefore more desirable than longer domain names. Even short domain names of arbitrary characters can be more desirable than longer domain names of recognizable words. Accordingly, the first adjustment provides a greater significance value increase for domain names formed from fewer characters.

The process performs a second adjustment for adjusting (at 130) the domain name significance value when the domain name contains a word with a dictionary definition. Buyers value domain names with recognizable or known words more than domain names containing arbitrary alphanumeric characters. Once again, these domain names are easier to remember. Accordingly, a domain name that includes a dictionary recognized word is provided a greater significance value increase than a domain name that does not include such wording. As part of the second adjustment step, the process may slightly increase the significance value of domain names containing insignificant or intentional misspellings of a dictionary term. For example, the significance value of the domain name "examplez.com" would be increased greater than the value of the domain name "xmplz.com".

The process performs a third adjustment for adjusting (at 140) the significance value when the domain name identifies a product or business name. A valid product or business name can be determined from an Internet search query or a business registry lookup. The significance value is increased for domain names including a valid product or business name. In some embodiments, the third adjustment results in a lesser increase than either of the first and second adjustments.

The process then performs a fourth adjustment to adjust (at 150) the significance value of domain names that include trending words. Specifically, the process increases the significance value of a domain name when the domain name is formed from or includes one or more trending words. The DNPOS identifies the trending words by monitoring user activity at the DNPOS and from monitoring Internet activity.

In monitoring user activity, the DNPOS tracks the number of user queries that are made at the DNPOS for domain names with certain words and further tracks the words within domain names recently purchased from the DNPOS. In some embodiments, the DNPOS can also use a relevance engine to link words relating to a common topic. For example, the words "shoes", "sneakers", "sandals", and "boots" are all different, but are all related to a common topic. Accordingly, the DNPOS performs the fourth adjustment to increase the significance value of a domain name containing one or more words trending within the user activated monitored at the DNPOS.

In some embodiments, the DNPOS monitors Internet activity to identify the trending words from search engine queries, social media activity, blogs, websites, and user activity on third-party applications or websites. For example, trending words are those words that most frequently appear in recent user searches, recent news reports, and recent user online postings across social media sites over a particular interval (e.g., the past month). Domain names that include a word exactly matching a trending word receive the greatest significance value increase. Domain names with small misspellings of a trending word or that include a synonym for a trending word receive a lesser increase to the significance value. The fourth adjustment occurs dynamically and in real-time. In other words, if a first potential buyer searches for a particular domain name at a first time when wording or lettering of the particular domain name is trending, then the significance value and resulting price of the particular domain name will be greater than if a second potential buyers searches for the particular domain at a second time when the wording or lettering of the particular domain name is no longer trending or the trend has subsided or decreased in intensity.

The process optionally scales (at 160) the derived significance value according to available domain name supply. The scaling can involve applying a multiplier to the significance value. In some embodiments, the scaling is based on availability of domain names of similar character length. For example, the process gradually increases the significance value for any available four character domain name as fewer and fewer four character domain names remain in the DNPOS inventory. In some embodiments, the scaling is based on availability of domain names with a particular word or character sequence. In some such embodiments, the process gradually increases the significance value for any domain name that includes a particular word or character sequence as more and more domain names with the particular word or character sequence are acquired from the DNPOS. The DNPOS can be configured with various thresholds for gradually scaling the significance value as domain name of similar character length, wording, or character sequence become more and more scarce.

The process dynamically prices (at 170) domain names according to the various significance value adjustments and scaling described above at the time those domain names are presented to potential buyers. Some embodiments use one or more of the above described adjustments in computing the significance value for a domain name. The significance values are stored to a database in conjunction with the scored domain names.

The process then presents (at 180) the dynamically priced domain names through an interface to a potential buyer. The interface can be presented on a web browser or other application running on a network enabled device of the potential buyer. From the interface, the buyer can select and purchase a particular domain name for the identified price. In response, the process registers (at 190) the particular domain name to the buyer.

In some embodiments, registration involves creating a WHOIS record for an acquired domain name and using the Extensible Provisioning Protocol (EPP) to allocate the particular domain name along with the WHOIS record within one or more registries. In some embodiments, registration involves listing purchased domain names on name servers in order to have the purchased domain names become reachable on the Internet. In some such embodiments, the DNPOS configures and provides DNS resolution for the purchased domain names. This can include creating and adding domain zone files to master servers or DNS authoritative servers as further described with reference to FIG. 6 below.

As is well known in the art, single word domain names and domain names of five or fewer alphanumeric characters are in very limited supply, even for gTLDs. Accordingly, the majority of available and sought after domain names are now compound worded domain names.

Compound worded domain names are domain names constructed from two or more words of significance. The domain names "bestexample.com" and "bigsky.org" are examples of compound domain names.

The proliferation and number of gTLDs that are now available, and specifically, the number of different top-level domains other than .com, .net, and .org that are now available have created a new set of compound worded domain names. These include domain names made up of one or more words of significance for the second-level domain (SLD) name and one or more words of significance for the TLD. The domain name "clothes.shop" is a compound worded domain name that is formed from the word "clothes" in the SLD and the word "shop" in the TLD.

In some embodiments, the DNPOS implements additional methodologies to further adjust or compute the significance of compound worded domain names. The methodologies apply to compound worded domain names that are formed strictly from characters in the SLD (e.g., "bigsky.org") as well as compound worded domain names that are formed from one or more words as the SLD and one or more words as the TLD (e.g., "big.sky").

In determining the significance of a compound worded domain name, the DNPOS differentiates between compound worded domain names that are constructed from two or more words with independent meaning or significance but with no combined significance from compound worded domain names that are constructed from two or more words with combined meaning or significance. For example, the compound worded domain name "wallphone.com" is formed from two words that have no combined significance, whereas the compound worded domain names "wallstreet.com" and "cellphone.com" have combined significance, thereby making the "wallstreet.com" and "cellphone.com" compound worded domain names more desirable than "wallphone.com".

Figure 2:
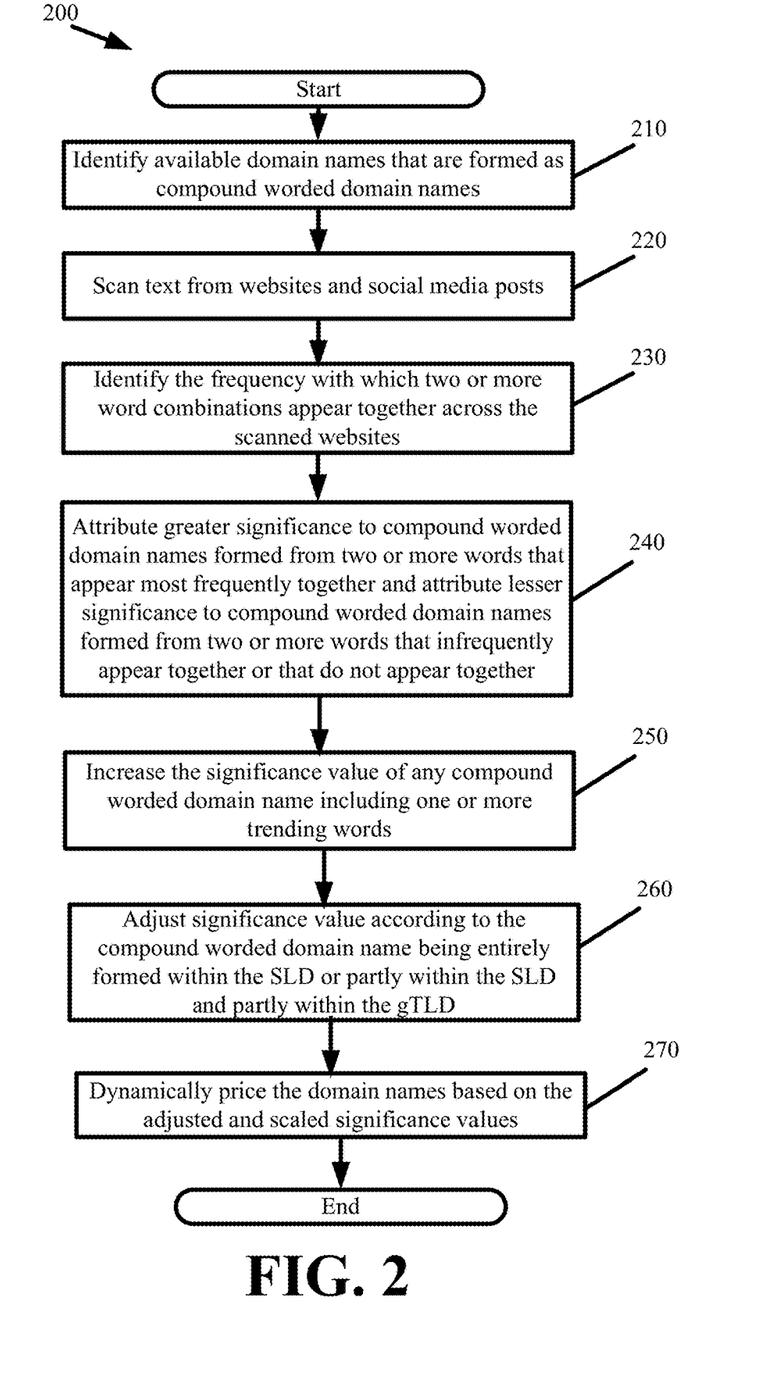
FIG. 2 presents a process by which the DNPOS computes the significance of a compound worded domain name in accordance with some embodiments.

FIG. 2 presents a process 200 by which the DNPOS computes the significance of a compound worded domain name in accordance with some embodiments. Process 200 can be implemented in addition to or independent of process 100 above in determining the significance value of a compound worded domain name.

Process 200 commences by identifying (at 210) available domain names that are formed as compound worded domain names. The identification involves identifying available domain names formed from any two or more words that can be found in a dictionary, business registry, or on some website or social media posting.

Next, the process differentiates compound worded domain names having combined significance from compound worded domain names not having combined significance. To do so, the process scans (at 220) text from websites and social media posts. The process identifies (at 230) the frequency with which two or more word combinations appear together across the scanned websites. The process then attributes (at 240) greater significance to compound worded domain names formed from two or more words that appear most frequently together and attributes lesser significance to compound worded domain names formed from two or more words that infrequently appear together or that do not appear together.

The process then further differentiates compound worded domain names formed from trending words from other compound worded domain names. The differentiation involves dynamically adjusting the domain name significance values based on the presence or absence of trending words within the domain name. As noted above, the DNPOS identifies trending words by monitoring Internet activity and user activity at the DNPOS. The process increases (at 250) the significance value of any compound worded domain name including one or more trending words. Domain names that include words exactly matching with a trending word or that are formed from two or more trending words receive the greatest significance value increase. Domain names with small misspellings of a trending word or that include a synonym for a trending word receive a lesser increase to the significance value.

The process further adjusts (at 260) the significance value of a compound worded domain name according to the compound worded domain name being entirely formed within the SLD or partly within the SLD and partly within the gTLD. For instance, the domain names "LosAngeles.com" and "LosAngeles.build" as well as the domain names "clothesshop.com" and "clothes.shop" have different meanings and value. In some instance, the formation of a compound worded domain name using the SLD and gTLD makes the domain name easier to remember and shorter, thereby making the domain name more valuable than a similar compounded worded domain name formed entirely in the SLD with an arbitrary TLD or gTLD extension. The significance value adjustment therefore accounts for trends and length of the domain name.

As with process 100, process 200 can include a step for scaling (at 260) the significance value according to domain name scarcity. Scarcity can be based on different factors including availability of domain names of different character lengths and available of domain names including specific words or character sequences.

The process then dynamically prices (at 270) the domain names based on the adjusted and scaled significance values when the domain names are requested and presented to a potential buyer. In this manner, the DNPOS, whether operating at the registry or registrar level, prices domain names with trending and meaningful words more expensive than domain names with arbitrary or no meaning. The price differentiation discourages squatters from purchasing desirable domain names with the sole intention of reselling at a higher price. The increase in the initial acquisition price of a significant domain name increases the risk and decreases the potential that a squatter can profit from the resale of that domain name. As a result, more domain names will remain available at the DNPOS for legitimate buyers that will use the domain names to identify a website, product, or service.

The significance value derivation causes the DNPOS to assign the highest pricing to available domain names that include the fewest number of highly desirable words and fewest lettering relevant to identified trending words or topics. The DNPOS assigns the next highest pricing to compound worded domain names that include or are relevant to trending words or topics with differentiated pricing between compound worded domain names formed entirely in the SLD from compound worded domain names formed partly in the SLD and gTLD. Compounded worded domain names with significance but that lack relevance to trending words or topics are assigned lower pricing with the lowest pricing reserved for domain names containing arbitrary lettering and/or numbering of no significance and no relevance to trending words or topics.

The process then presents a customized list of dynamically priced domain names to a potential buyer through an online interface. The process optionally registers a particular domain name that the potential buyer purchases using the interface.

Figure 3:
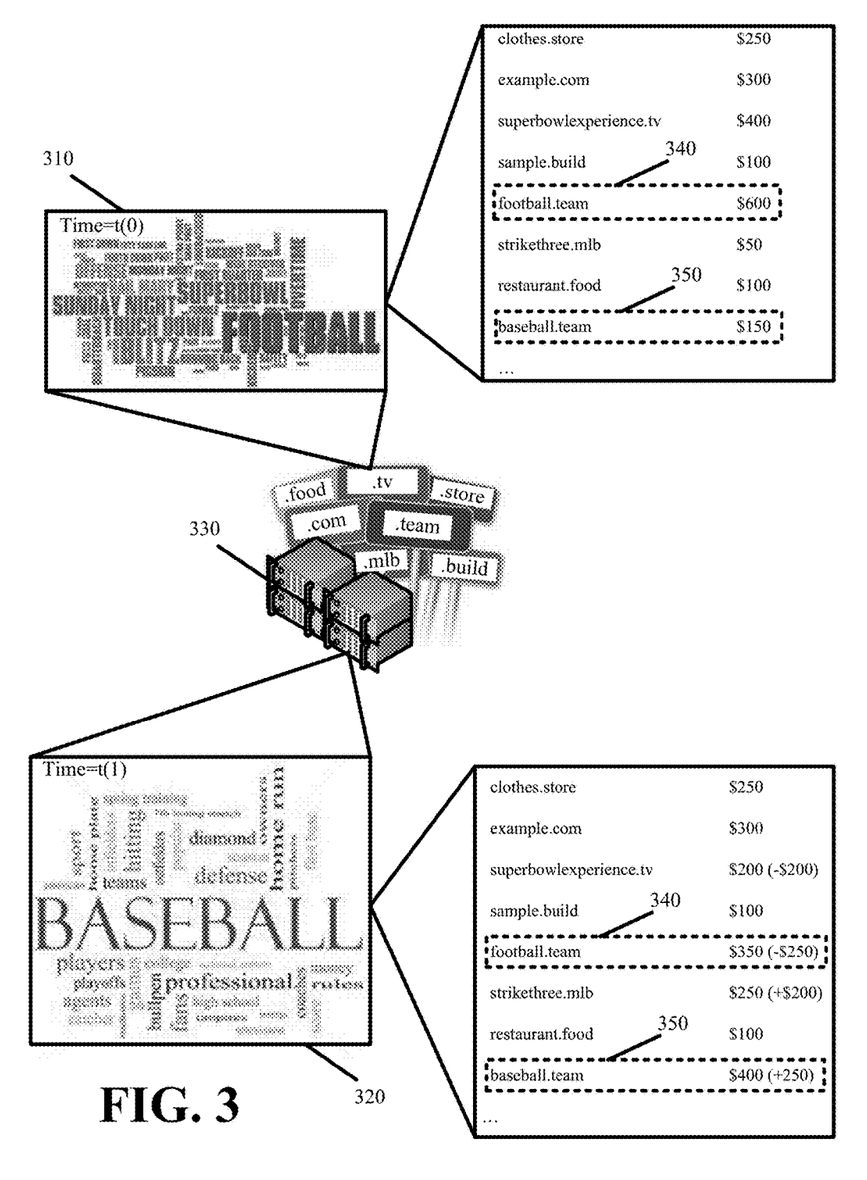
FIG. 3 conceptually illustrates dynamic domain pricing in accordance with some embodiments.

FIG. 3 conceptually illustrates dynamic domain pricing in accordance with some embodiments. The figure illustrates a first "word cloud" 310 identifying trending words at a first time and a second word cloud 320 identifying a different set of trending words at a second time. Each word cloud 310 and 320 presents the most frequently trending words larger than lesser frequently trending words. As can be seen, the DNPOS 330 changes the pricing of the available domain names in accordance with the different trending words shown in the first word cloud and the second word cloud. Specifically, the pricing of the compound worded domain name "football.team" 340 decreases from the first time to the second time as the word "football" trends less at the second time than at the first time, while pricing of the compound worded domain name "baseball.team" 350 increases from the first time to the second time as the word "baseball" trends more at the second time than at the first time. Thus, the DNPOS domain name pricing reflects temporal shifts in buyer attitude. The presented exemplary pricing can represent wholesale pricing the DNPOS presents to different registrars when operating as a registry or retail pricing the DNPOS presents directly to users when operating as a registrar.

In addition to setting the dynamic domain name pricing based on the computed significance values, some embodiments also dynamically modify the list of available domain names that are presented to users based on the significant values. This reduces the amount of searching that a potential buyer performs in order to find an available domain name that is desirable and of interest to the potential buyer.

Figure 4:
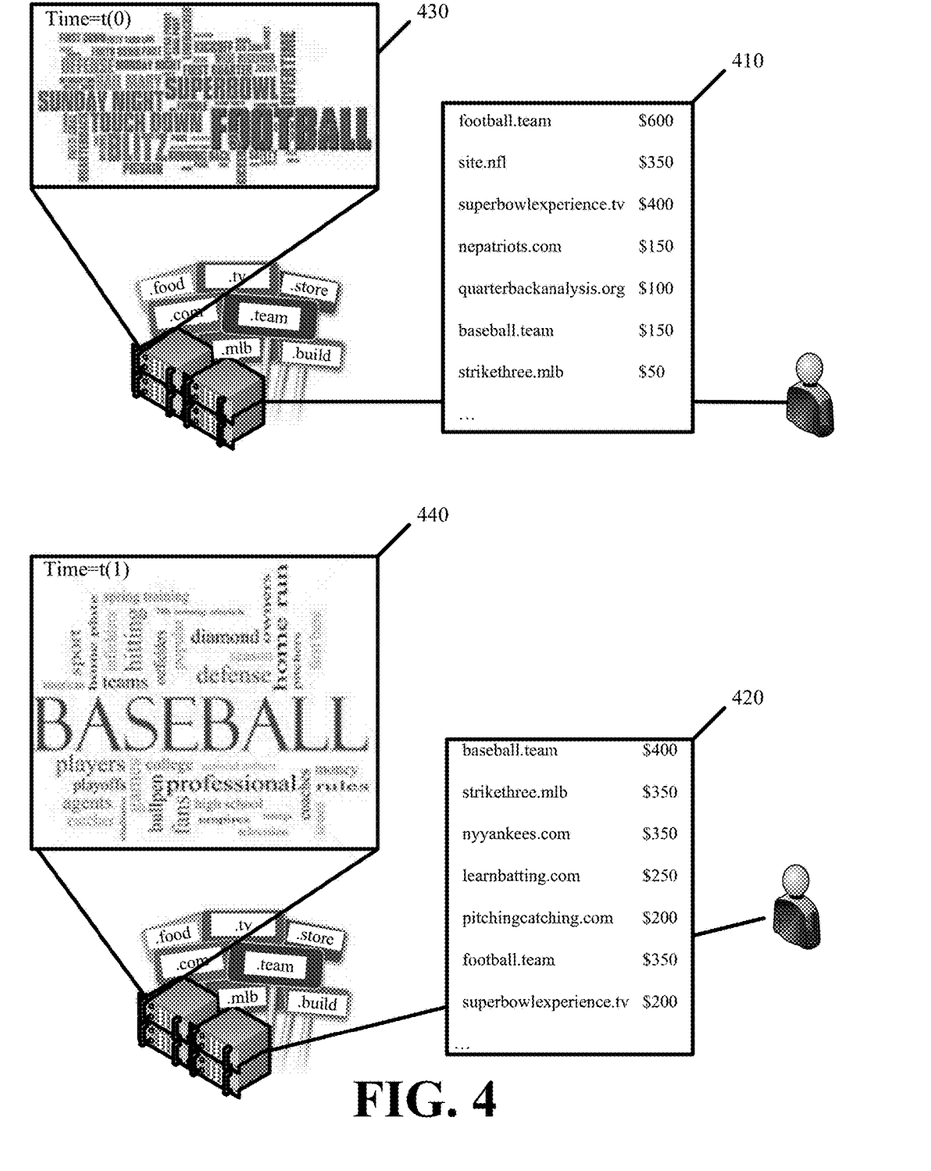
FIG. 4 presents exemplary interfaces of the DNPOS dynamically presenting a list of most significant and available domain names along with dynamic pricing for each.

FIG. 4 presents exemplary interfaces of the DNPOS dynamically presenting a list of most significant and available domain names along with dynamic pricing for each. The figure presents two interfaces 410 and 420. Each interface 410 and 420 is generated according to a different set of trending words identified by the word clouds 430 and 440. In each interface, the list of available names is sorted according to the dynamic significance that the DNPOS computes for each domain name. As can be seen, the presented list changes as different words are trending.

Figure 5:
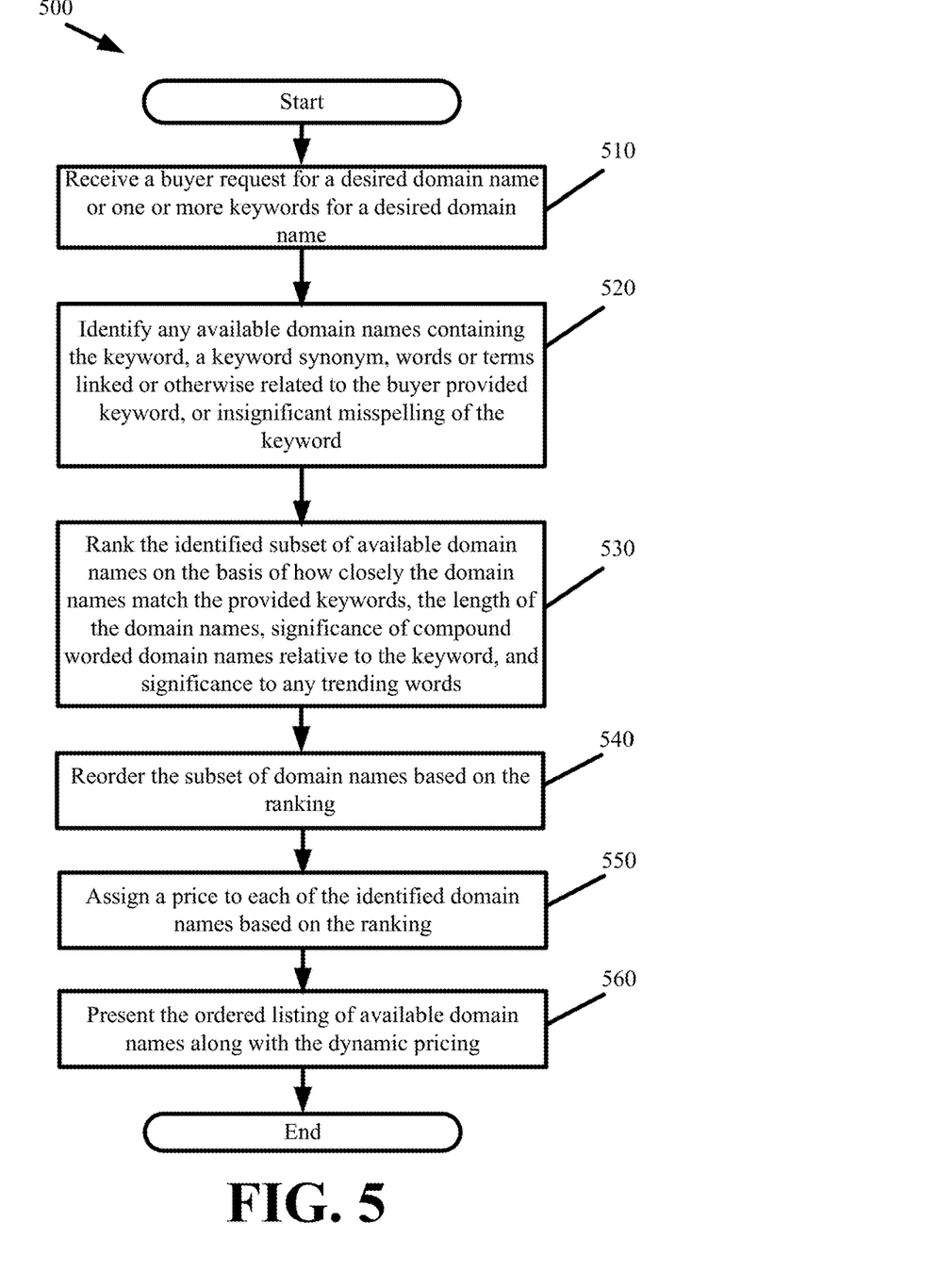
FIG. 5 presents a process performed by the DNPOS for generating a customized listing of available domain names for a potential buyer in accordance with some embodiments.

Some embodiments further customize the presented listing of available domain names for each potential buyer. FIG. 5 presents a process 500 performed by the DNPOS for generating a customized listing of available domain names for a potential buyer in accordance with some embodiments.

The process is initiated when the DNPOS receives (at 510) a buyer request for a desired domain name or one or more keywords for a desired domain name. The DNPOS then recomputes the significance values for the available domain names based on buyer provided keyword(s). Specifically, the process identifies (at 520) any available domain names containing the keyword, a keyword synonym, words or terms linked or otherwise related to the buyer provided keyword, or insignificant misspelling of the keyword. The process ranks (at 530) the identified subset of available domain names on the basis of how closely the domain names match the buyer provided keywords, the length of the domain names, significance of compound worded domain names relative to the keyword, and significance to any trending words. The process reorders (at 540) the domain names and then assigns (at 550) a price to each of the identified domain names based on the determined ranking. The process then presents (at 560) the ordered listing of available domain names along with the dynamic pricing derived by the DNPOS.

Operating as a registrar, buyers can purchase domain names directly from the DNPOS for the dynamically determined price. A purchased domain name is registered to the buyer. In some embodiments, domain name registration involves removing the domain name from the list of available domain names and associating the domain name to an account of the buyer. Domain name registration further involves configuring DNS operation to make any domain names acquired by a buyer reachable over the Internet.

In some embodiments, the DNPOS manages and operates DNS servers (i.e., name servers) for the TLDs, ccTLDs, gTLDs, and other zones under DNPOS control. These DNPOS DNS servers include authoritative name servers for the TLDs, ccTLDs, and gTLDs under DNPOS control. Registration involves configuring these DNS servers to perform DNS resolution for DNS queries directed to the TLDs, ccTLDs, and gTLDs offered and sold by the DNPOS. DNPOS DNS configuration may include configuring DNS resource records (e.g., A records) or DNS zone files for resolving the buyer purchased domain names to Internet Protocol (IP) addresses, authoritative name servers, or other DNS servers within the DNS hierarchy that resolve the SLD of the acquired domain name to an IP address.

Figure 6:
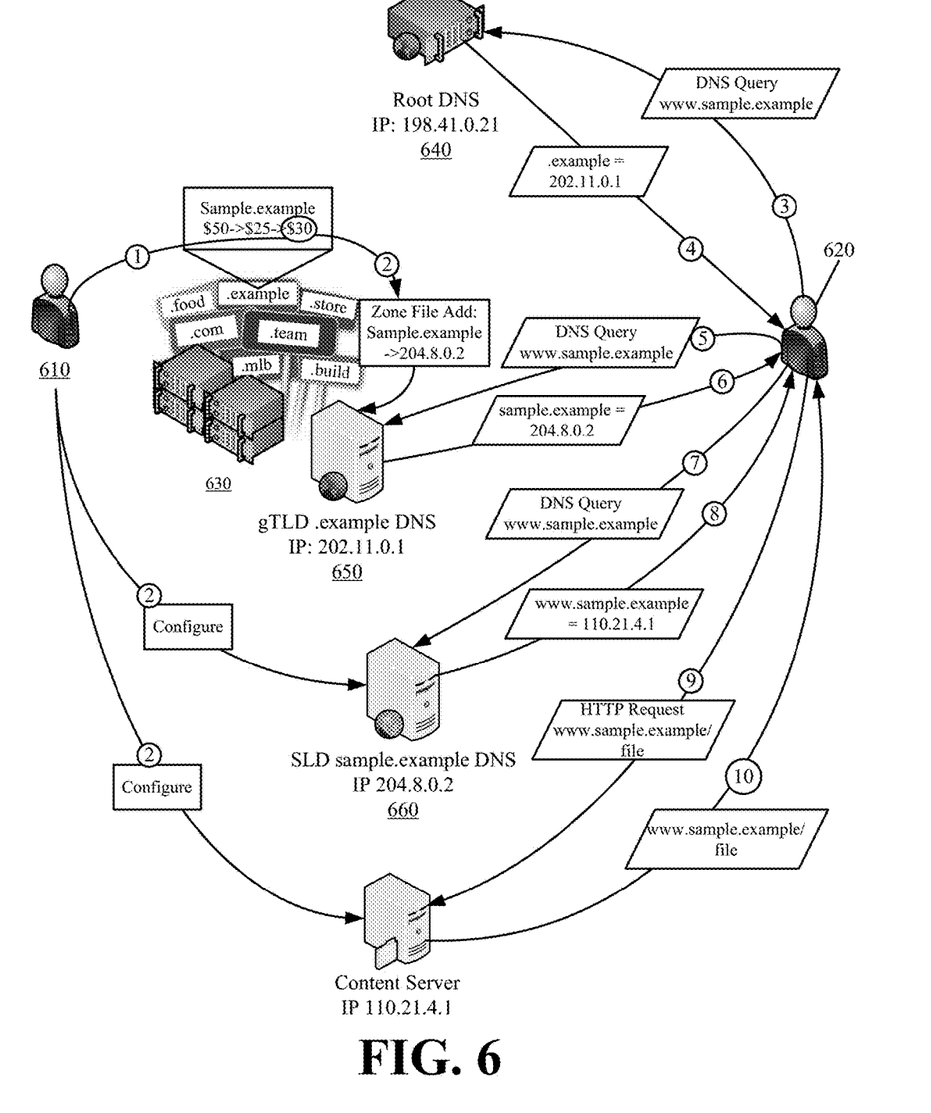
FIG. 6 illustrates DNS operation provided by the DNPOS in accordance with some embodiments.

FIG. 6 illustrates DNS operation provided by the DNPOS in accordance with some embodiments. The figure illustrates a domain name buyer 610, a user 620, and the DNPOS 630. The figure further illustrates a root DNS server 640, a gTLD authoritative DNS server 650 configured by and under the DNPOS 630 control, and an SLD authoritative DNS server 660 configured by domain name buyer 610.

The DNPOS 630 modifies the pricing of its available domain names according to changing trending words. The DNPOS 630 sells and registers the "sample.example" domain name to the buyer 610. As part of registering the domain name, the DNPOS 630 configures its DNS server 650 for resolution of DNS requests directed to the "sample.example" domain name. The DNPOS 630 DNS server 650 is the authoritative DNS server for the ".example" gTLD. Accordingly, the DNS server 650 is tasked with resolving any DNS requests directed to the ".example" gTLD. In this figure, the registrar 630 configures the DNS server 650 to resolve requests for the "sample.example" domain name to the buyer 610 configured SLD authoritative DNS server 660 for subsequent resolution to a server appointed by the buyer 610.

When the user 620 attempts to access a website or other content from "www.sample.example/file", the user 620 issues a DNS request. The DNS request first queries the root DNS server 640. The root DNS server 640 identifies the DNPOS's 630 gTLD authoritative DNS server 650 as the name server resolving the ".example" gTLD. The user 620 passes the DNS request to the gTLD authoritative DNS server 650. In response to the request, the gTLD authoritative DNS server 650 identifies the SLD authoritative name server 660 for "sample.example". The SLD authoritative name server 660 is a DNS server configured or operated by the domain name buyer 610. The user 620 then passes the DNS request to the SLD authoritative name server 660 which resolves the DNS request and responds to the DNS request with an IP address to a server hosting the "www.sample.example/file" site.

Figure 7:
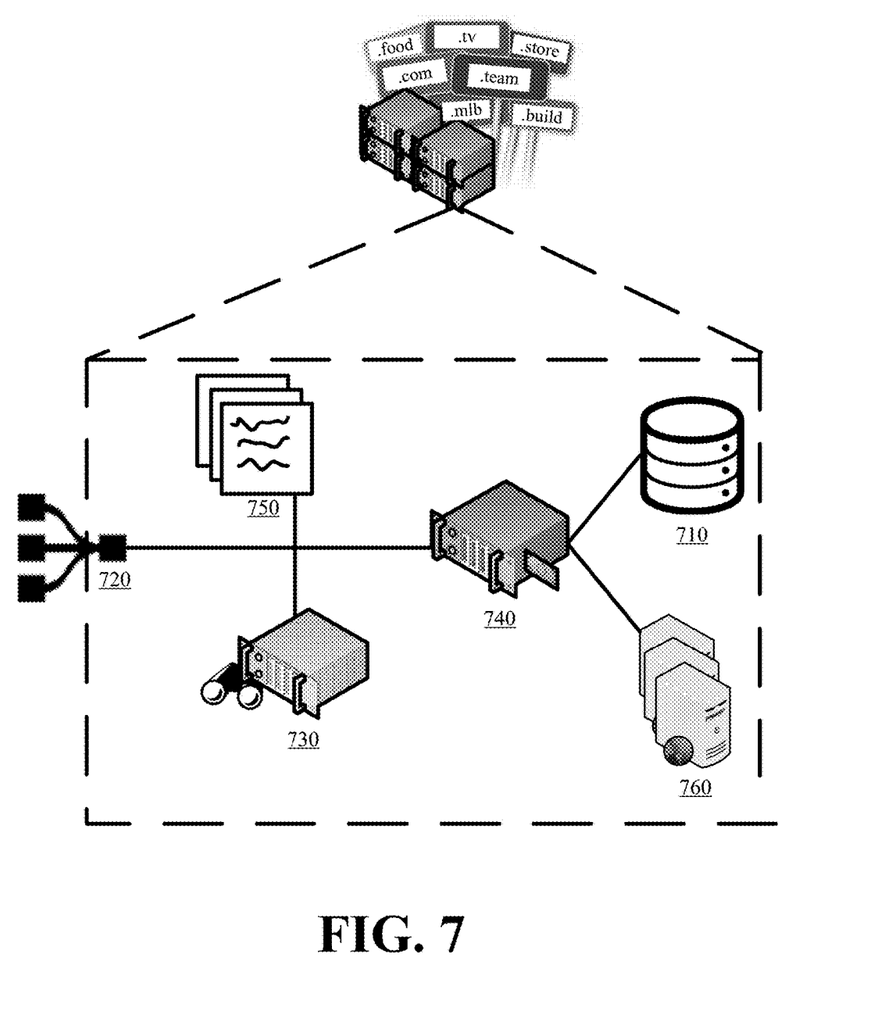
FIG. 7 conceptually illustrates components of the DNPOS of some embodiments.

FIG. 7 conceptually illustrates components of the DNPOS of some embodiments. As shown, the DNPOS includes a database 710, a network interface 720, an Internet activity monitor 730, a dynamic pricing engine 740, a dynamic user interface 750, and authoritative name servers 760 for the TLDs, ccTLDs, and gTLDs under DNPOS control. These components 710-760 are implemented using one or more machine with hardware presented in FIG. 8 below.

The database 710 is a non-transitory computer-readable storage medium. The database 710 stores the domain names that the DNPOS has available for sale. The database 710 also stores the significance values that are computed for each of the domain names according to the processes described above. In some embodiments, the database 710 also stores a dictionary with which the DNPOS differentiates actual words from arbitrary characters.

The network interface 720 provides access to other network accessible machines and the Internet. The network interface 720 provides the means with which the DNPOS identifies trending words, determines how to score significance of different domain names, and presents the available domain names to customers for sale.

The Internet activity monitor 730 leverages the network interface 720 to monitor Internet activity including, for example, user search queries, social media posts, and websites in order to determine whether words of a compound worded domain name have a combined significance and to determine what words are currently trending.

The dynamic pricing engine 740 computes the significance values for the domain names and dynamically prices the domain names according to the changing significance values. In some embodiments, the dynamic pricing engine 740 leverages the network interface 720 to perform searches of the words of different available domain names in order to derive their significance. The dynamic pricing engine 740 also adjusts significance values and domain name pricing according to domain name length, inclusion of dictionary words, product names, and business names, inclusion or similarity to trending words, significance between words of a compound worded domain name.

In some embodiments, the dynamic pricing engine 740 also generates the dynamic user interfaces 750. The dynamic user interfaces 750 include websites presented through a web browser or screens that are wirelessly transmitted over a digital network to an application running on a user device. The dynamic user interfaces 750 are the means through which user can identify and register available domain names from the DNPOS. The generated user interfaces 750 are dynamic and change presented lists and pricing of domain names according to changing significance values, trending words, etc.

Upon the successful sale and registration of a domain name, the dynamic pricing engine 740 can also configure the DNS servers 760. As described above with reference to FIG. 6, the DNS servers 760 are managed or operated by the DNPOS for purposes of resolving DNS queries directed to TLDs, ccTLDs, and gTLDs under registrar control. These DNS servers 760 operate within the DNS hierarchy and typically function to resolve DNS queries to SLD authoritative name servers.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
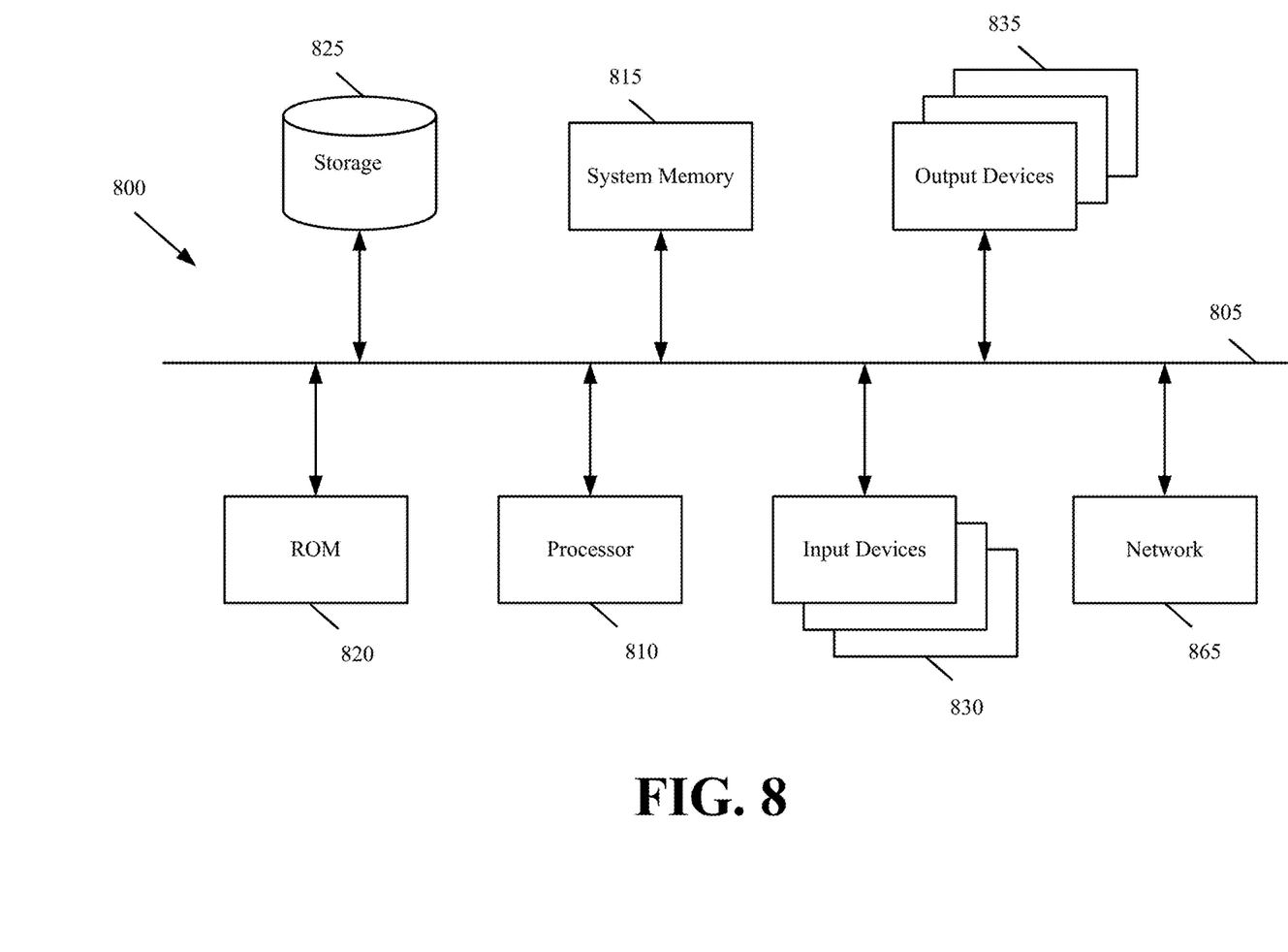
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines, including the DNPOS described above. The computer system of FIG. 8 also illustrates various resources on which the services described above execute. Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A computer-implemented method comprising:
   receiving, at a domain name registry, a plurality of available domain names prior to a first registration or first sale of any domain name from the plurality of available domain names;
   determining, at the domain name registry, an initial price at which the plurality of available domain names are offered to one or more registrars;
   adjusting, at the domain name registry, a first price parameter for a particular domain name of the plurality of available domain names based on a number of search results returned in response to a query of the particular domain name;
   adjusting, at the domain name registry, a second price parameter for the particular domain name based on a number of characters forming the particular domain name, wherein computing the second price parameter comprise changing the second price parameter for each additional character that forms the particular domain name;
   adjusting, at the domain name registry, a third price parameter for the particular domain name based on proximity between spelling of the particular domain name to one of a plurality of words in a dictionary;
   compiling, at the domain name registry, a list of currently trending words based on a number of times each word in the list of currently trending words is queried by a plurality of users;
   adjusting, at the domain name registry, a fourth price parameter for the particular domain name based on similarity between the particular domain name and one or more words from said list of currently trending words;

adjusting, at the domain name registry, a fifth price parameter for the particular domain name based on a number of domain names from the plurality of available names that have one or more of a similar spelling or similar definition as the particular domain name, and that remain unregistered;

providing, from the domain name registry to at least one domain name registrar, a dynamic price for the particular domain name based on the initial price and two or more of the first, second, third, fourth, and fifth price parameters;

registering the particular domain name in response to a buyer acquiring the particular domain name for the dynamic price, wherein said registering comprises configuring operation of an authoritative Domain Name System (DNS) server controlling resolution of DNS queries to a top-level domain (TLD), country-code top-level domain (ccTLD), or generic top-level domain (gTLD) of the particular domain name;

receiving at the authoritative DNS server, a DNS query directed to the particular domain name; and resolving the DNS query by identifying a server address specified from said configuring.

2. The method of claim 1, wherein the server address comprises an address of a DNS server that is authoritative for a second-level domain (SLD) of the particular domain name.

3. The method of claim 1, wherein the server address comprises an address of a server hosting content or a service requested using the DNS query.

4. The method of claim 1, wherein the particular domain name is a compound worded domain name comprising at least a first word as an SLD and at least a second word as a TLD or gTLD.

5. The method of claim 4, wherein said adjusting the fourth price parameter comprises increasing the fourth price parameter by a first amount based on at least one of the first word and the second word specifying a word within the list of currently trending words.

6. The method of claim 5, wherein said adjusting the fourth price parameter further comprises increasing the fourth price parameter by a different second amount based on the first word and the second word having a combined significance.

7. The method of claim 5, wherein said adjusting the fourth price parameter further comprises increasing the fourth price parameter by a different second amount based on the first word and the second word forming a term or phrase identified from Internet searching.

8. The method of claim 1, wherein compiling the list of current trending words comprises scanning at least one of Internet search activity and social media posts and identifying a set of most frequently used words.

9. The method of claim 1, wherein the particular domain name is an alphanumeric string.

10. The method of claim 1 further comprising monitoring availability of domain names having similar character length as the particular domain name and wording or character sequence as the particular domain name.

11. The method of claim 10 further comprising increasing pricing of the particular domain name in response to said availability falling below a threshold.

12. The-method of claim 1 further comprising modifying pricing of the particular domain name from a first price derived in part from trending words at a first time to a different second price derived in part from different trending words at a later second time.

13. The method of claim 1 further comprising modifying a DNS resource record to resolve the particular domain name to an SLD authoritative DNS server.

14. The method of claim 1, wherein said modifying pricing comprises increasing pricing for domain names comprising one of or a related spelling of the currently trending words, and decreasing pricing for domain names not comprising one of or a related spelling of the currently trending words.

15. The method of claim 1 further comprising increasing pricing for the particular domain name with an SLD and TLD or gTLD combination that matches to two or more worded phrases identified in the currently trending words, and decreasing pricing for the particular domain name with an SLD and TLD or gTLD combination that does not match any two or more worded phrases identified in the currently trending words.

* * * * *